(12) United States Patent
Mattson

(10) Patent No.: US 6,284,076 B1
(45) Date of Patent: Sep. 4, 2001

(54) SIGNAGE MASKING TOOL AND METHOD

(76) Inventor: Harlan R. Mattson, 12288 Flag Ave. South, Savage, MN (US) 55378

( * ) Notice: Subject to any disclaimer, the term of this patent is extended or adjusted under 35 U.S.C. 154(b) by 0 days.

(21) Appl. No.: 09/496,699

(22) Filed: Feb. 2, 2000

(51) Int. Cl.$^7$ ..................................................... B32B 31/00
(52) U.S. Cl. .............................. 156/71; 156/577; 156/579
(58) Field of Search .............................. 156/71, 574, 577, 156/579

(56) References Cited

U.S. PATENT DOCUMENTS

| | | | |
|---|---|---|---|
| 4,263,347 | * 4/1981 | Banta ..................................... | 427/282 |
| 4,818,329 | * 4/1989 | Tutas et al. ........................... | 156/391 |
| 5,470,430 | * 11/1995 | Lewis et al. .......................... | 156/577 |
| 5,795,435 | * 8/1998 | Waters, Jr. ............................ | 156/577 |

OTHER PUBLICATIONS

Airmark 1999 Catalog, pp. 42 and 43. U.S.A.
Signs + Banners Wholesale Sign Supplies, pp. 2 and 3, U.S.A.
N. Glantz & Son, May 1, 1997, p. 65, U.S.A.

* cited by examiner

Primary Examiner—James Sells
(74) Attorney, Agent, or Firm—Moore & Hansen

(57) ABSTRACT

A tool and method for masking or applying a layer of laminate to a material. The tool comprises a telescopic axle assembly for providing a cylindrical outer surface of various lengths to accommodate different sized rolls of masking. The cylindrical outer surface carries the masking roll, allowing it to rotate freely as the roll feeds the masking to the work material being masked. The tool further comprises a plurality of support systems, each of which providing at least one contact surface for sliding or rolling along a working platform. The axle assembly is preferably long enough to allow the support systems to be constructed and arranged to straddle the work material so that interference between the contact surfaces and the work material is avoided. In operation, the tool is moved over the work material, paying out a length of laminate, which is applied to the material using a smoothing object. While the tool is being moved along the surface of the work platform, the two axle segments comprising the axle assembly, rotate relative to each other, and maintain a generally parallel relationship between the axle assembly and the area of the work platform directly below the axle assembly.

20 Claims, 1 Drawing Sheet

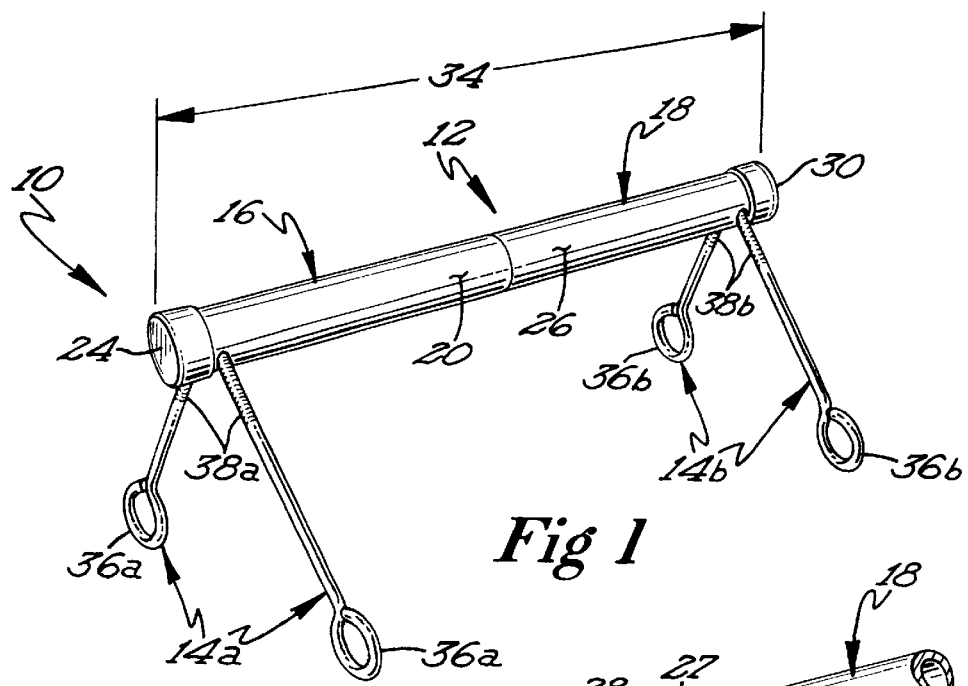
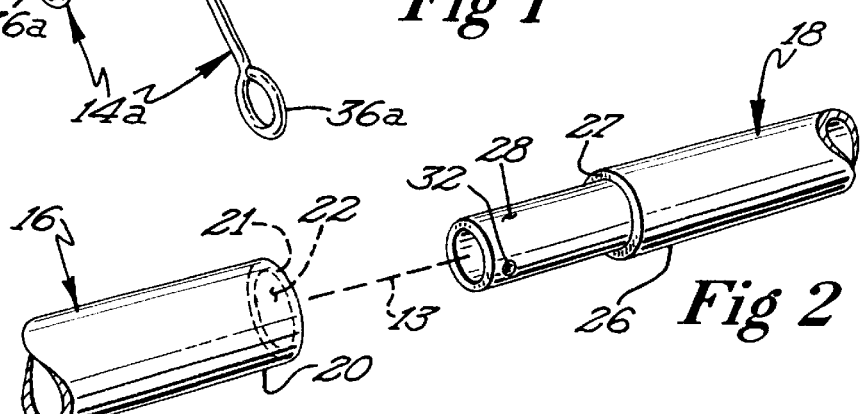
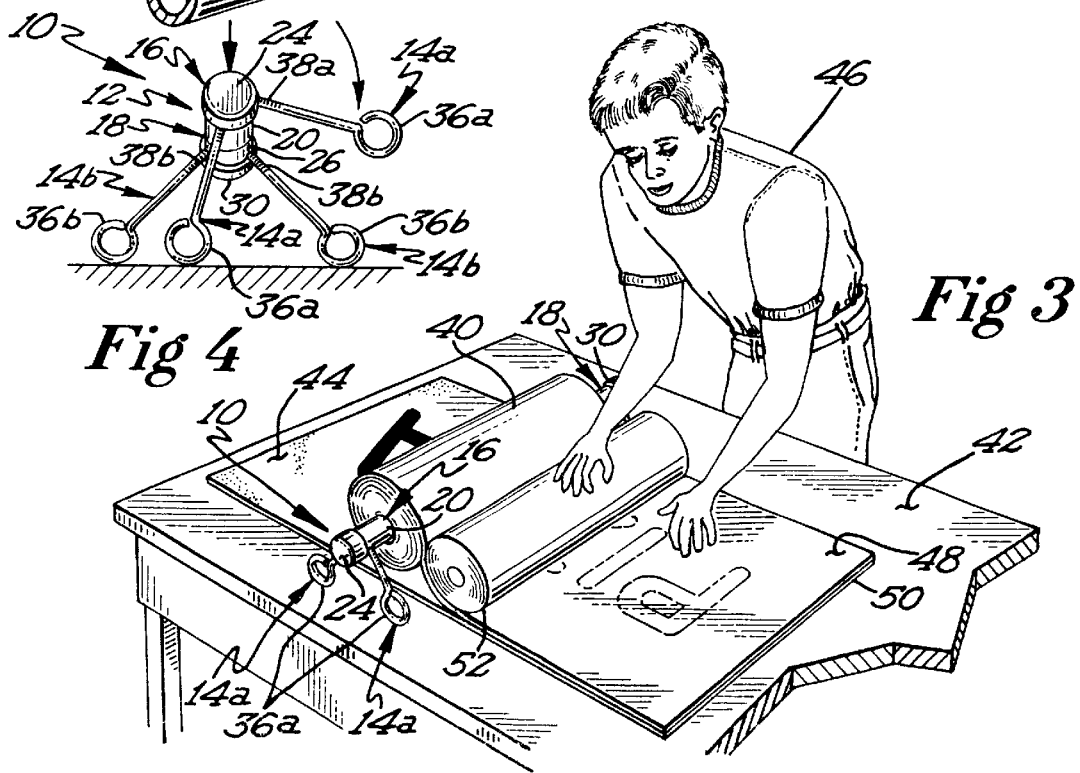

SIGNAGE MASKING TOOL AND METHOD

BACKGROUND OF THE INVENTION

There are a variety of processes that require the application of a thin laminate layer onto a surface from a roll. One such process arises when making signs.

Small-scale professional sign making involves carving letters and shapes into a two-layered sheet of material. The top layer is often made of vinyl, paper, or similar material and the letters, numbers and graphics for a given sign are cut from this top layer. The top layer carries an adhesive on its lower surface for adhering the resulting letters and other characters to a sign backing which forms the second or bottom layer. This adhesive is also used to secure the characters to the final surface for which the characters of the sign were intended. The bottom layer has a low adhesion upper surface so that the top layer may be removed without damaging the characters. There is enough adhesion between the layers, however, so that after the sign characters are carved out of the top layer, the letters and graphics are held in place on the bottom backing layer by the adhesive, allowing the waste material around the characters to be carefully lifted off of the bottom layer and discarded.

In order to remove the newly formed letters, numbers and graphics from the bottom layer and place them on the surface for which they are ultimately intended, such as a vehicle door, store window or the like, it is essential that the characters be preserved in their original positions. To achieve this result, a carrier laminate known as masking is applied to the upper surface of the characters and to the exposed portions of the upper surface of the bottom layer. This masking has a mild adhesive on its lower surface so that it may be used to remove the characters from the backing, preserving their original positions, and to apply the characters to the receiving surface. The masking is typically translucent so the characters may be seen through the masking for ease in positioning the characters on the receiving surface. Once the proper orientation on the receiving surface is attained, the characters are pressed against the receiving surface and the masking is peeled away.

Applying the masking to the upper surface of the top layer is a crucial step that has traditionally required painstaking care to avoid damaging the formed characters and graphics or compromising the orientation of the characters. Such masking is produced and sold on rolls. Specialized devices are available for assisting the sign maker in applying masking.

One such known device includes a roller either fixed to the edge of a table or placed on the table's surface. The sign maker using this device places the sign to be masked on the table adjacent the edge with the roller. A length of masking material is pulled from the roll and carefully stretched directly over, and aligned carefully with, the sign. The sign maker then uses a straight edge or paddle to smooth the masking over the sign. Applying the masking to the sign is a very difficult step. Even when done carefully, this step may result in the formation of wrinkles in the masking layer. Such imperfections can damage the characters or cause them to become misaligned on the resulting sign.

Such imperfections often result when the working platform, on which the sign is being made, contains irregularities, undulations, or other non-planar areas. Considering that many small-scale sign makers operate from old buildings having uneven flooring, less than optimal humidity control, old workbenches, etc., it becomes apparent how such businesses can be plagued by problems obtaining, or maintaining, a planar work platform. This prior art device does not tolerate a nonplanar working surface.

Another disadvantage of this device is the difficulty it presents in making long or large signs. Longer signs require more masking to be pulled from the roll and positioned over the sign. This increases the margin for error and level of difficulty in applying the masking to the sign without creating wrinkles.

For large signs which are wide as well as long, large automated masking devices are employed. These devices work with virtually no human interaction and do an adequate job of applying masking without error. They incorporate rollers as work surfaces so the quality of the masking is not affected by the undesirable elements listed above. However, these machines are large and very expensive. The cost and size are prohibitive for most small-scale sign businesses.

There is a need for a device that improves the manual masking process by minimizing the likelihood of error when manually applying masking or similar laminate layer. It would be advantageous to provide a device which is relatively small and inexpensive, such as a hand tool, yet facilitates ease and efficiency in applying a masking or laminate layer to a sheet of material or other surface.

SUMMARY OF THE INVENTION

The present invention relates to a signage hand tool for assisting small-scale sign makers in manually applying masking. The signage tool generally comprises an axle assembly and a plurality of elevating support systems. The axle assembly is constructed and arranged to carry a roll of masking material and to allow the roll to freely rotate therearound. The support systems are connected to, and elevate, the axle assembly above a working platform on which a sign is being masked. The support systems are of such a length and orientation that a roll of masking material carried on the axle assembly does not make contact with the platform.

The axle assembly could comprise any elongate member or systems spanning partially or completely between the support systems. The axle assembly is sized to fit within the carrying tube of a standard roll of masking. Preferably, the axle assembly comprises two opposed axle segments having cylindrical outer surfaces, one of the segments having an inner end with a cantilever post extending axially therefrom. The post has a diameter sized to fit within a socket in the inner end of the opposing axle segment. This configuration preferably provides a friction fit between the two cylinders of the axle assembly so that the cylinders have telescopic relationship with each other in that the confronting axle segments may be pulled slightly away from each other, thereby increasing the length of the overall axle assembly. The friction fit of this configuration also allows the segments to rotate relative to each other.

Alternatively, it is envisioned that the first axle segment comprises the entire axle shaft whereby the axle shaft itself forms the cantilever post. The second axle segment of this embodiment comprises a cap that fits over the end of the first axle segment and provides a location to which one support system may be attached.

In operation, the two axle segments of the axle assembly of the preferred embodiment are separated and a roll of masking is placed over one of the cylinders. The axle is then reassembled, forming a cylindrical outer surface, which defines an axis of rotation for the masking roll. The two axle segments of the axle assembly are pushed together to a length suitable to cause the support systems attached to the axle segments to limit the lateral movement of the masking roll while providing enough movement so that the roll can rotate freely around the axis of rotation. The tool is then placed on a relatively flat work platform and lightly pressed, causing the cylinders or tubes of the axle segments to rotate relative to each other until all of the feet of the support systems make contact with the platform.

Next, the material to be masked or laminated is placed under the tool and the leading edge of the material is aligned and adhered to the leading edge of the masking. An applicator roll or cylinder, which can be any straight cylindrical object such as a spare roll of masking, is held next to, and generally parallel to, the roll carried by the tool so that the applicator roll presses the masking onto the material to be masked. The sign maker then slides the tool along the length of the sign. The masking will automatically unroll itself onto the material being masked so long as the applicator roll is held next to the tool in such a manner that it presses the masking onto the material. Preferably, the operator slides the tool across the work platform by moving the applicator roll into the hand tool. This allows the operator to use one hand to hold the signage material against the work platform. The abutting action of the applicator against the masking roll on the signage hand tool ensures a parallel relationship between the two rolls.

As the tool passes over imperfections and undulations in the work platform, the tool automatically adjusts itself in order to maintain a generally parallel relationship between the central axis of the axle assembly and the area on the platform immediately below the axle assembly. It accomplishes by allowing the two axle segments to rotate relative to each other about the central axis. As the leading foot of one of the support systems encounters an irregularity in the platform, such as an upward bump, the foot follows the bump upwardly. As the other three feet of the tool are still being pressed against the platform the bump causes the encountering axle segment to rotate relative to the other axle segment. Additionally, the tool is angled upward slightly toward the bump. This angle approximates a parallel reflection of the topography of a line drawn on the platform, immediately below the axle assembly. This feature results in fewer imperfections in the masking layer as it is applied to the sign characters.

If it is desired to mask material which is longer than the working platform on which the tool rests, it is envisioned that a first person hold the tool and applicator roll in place while a second person pull the work material along the working platform, under the tool. This arrangement would allow the masking or lamination of a length of material equal to the length of the masking on the roll.

It is possible to effect one person operation of the tool when masking a long piece of signage material by horizontally fixing the applicator roll to the work platform using a shaft assembly similar to that of the tool. With the applicator in place between the operator and the hand tool, the operator may begin to pull on the signage material. This will cause the tool to slide across the platform until it abuts against the horizontally fixed applicator roll. Once abutted, the masking roll will begin to unroll around the hand tool as the material is pulled by the operator.

It is further envisioned that the tool may comprise an additional bracket for carrying an applicator roll. This embodiment would facilitate one hand operation of the tool, thereby freeing the other hand for holding the material to be masked in place.

These and other objectives and advantages of the invention will appear more fully from the following description, made in conjunction with the accompanying drawings wherein like reference characters refer to the same or similar parts throughout the several views. And, although the disclosure hereof is detailed and exact to enable those skilled in the art to practice the invention, the physical embodiments herein disclosed merely exemplify the invention, which may be embodied in other specific structure. While the preferred embodiment has been described, the details may be changed without departing from the invention, which is defined by the claims.

DESCRIPTION OF THE DRAWINGS

FIG. 1 is a perspective view of a masking tool embodying the invention;

FIG. 2 is an enlarged perspective view of the mating configuration of the first and second axle segment of an axle assembly of the invention;

FIG. 3 depicts the hand tool of the present invention used in a masking operation; and, FIG. 4 is an end perspective view of the present invention indicating the relative rotation between the first and second axle segments as a result of a downward force.

DETAILED DESCRIPTION

Referring now to the drawings, and first to FIG. 1, there is shown a signage hand tool 10 of the present invention. Tool 10 comprises an axle assembly 12 and support systems 14.

Axle assembly 12 may comprise one elongate member for placement within the core tube of a roll of masking material, but preferably comprises a first axle segment 16 and a second axle segment 18. Axle assembly 12 may be formed of any suitable rigid material such as various hard metals or plastics. Polyvinyl chloride (PVC) tubing is an excellent example of a material well suited for use in this capacity.

In the preferred embodiment, detailed in the Figures, first axle segment 16 comprises a cylindrical outer surface 20, preferably a rigid hollow tube, having an inner end 21 defining an open socket 22 and an outer end 24. End 24 is depicted as closed for mainly aesthetic purposes and may be left open without changing the spirit or affecting the function of the invention.

Similarly, second axle segment 18 comprises a cylindrical outer surface 26, preferably a rigid hollow tube having an outside diameter substantially equal to that of cylindrical outer surface 20, such that, when first axle segment 16 is engaged with second axle segment 18, resulting axle assembly 12 has a generally uniform surface for carrying a roll of masking. Additionally, second axle segment 18 has a cantilever post 28 extending axially from an inner end 27 and having an outside diameter sized to frictionally fit within socket 22 of first axle segment 16. Like first axle segment 16, second axle segment 18 comprises an outer end 30, which is closed for aesthetic purposes. Additionally, second axle segment 18 is shown as having a protuberance 32, such as a rivet, added to the cantilever post 28 to increase the amount of friction between post 28 and socket 22 of first axle segment 16.

Cantilever post 28 of second axle segment 18 may be formed integrally with cylindrical surface 26. Alternatively, post 28 may be a solid post or hollow tube placed within axle segment 18, having an outside diameter substantially equal to, or slightly smaller than, the inside diameter of a tube forming cylindrical outer surface 26. In this embodiment, it is preferred that cantilever post 28 be secured to second axle segment 18, thereby providing more positive interaction between post 28 and first axle segment 16 and further ensuring that post 28 is not removed from second axle segment 18 when first axle segment 16 is separated from second axle segment 18.

First axle segment 16 and second axle segment 18, when mated, provide a length 34, which is long enough to accommodate a standard sized roll of masking material. Post 28 is of such a length as to allow a predetermined amount of telescoping between first axle segment 16 and second axle segment 18 without sacrificing stability. In this manner, a range of possible tool dimensions is provided, thereby allowing tool 10 to accommodate various sizes of masking rolls. Though first axle segment 16 and second axle segment 18 are depicted as having generally equal lengths, any relative lengths are envisioned and acceptable for accomplishing the spirit of the invention.

Axle assembly 12 is held elevated above a work platform by support systems 14a and 14b attached to each axle segment 16 and 18, respectively. Support systems 14 comprise curved feet 36 having relatively low coefficients of friction for movably contacting a work platform such as platform 42 shown in FIG. 3. Curved feet 36 facilitate sliding or rolling tool 10 over minor imperfections in a work platform. Two feet 36a and 36b are associated with each segment 16 and 18, respectively. Preferably, as shown in the Figures, each support system 14a and 14b may comprise a set of two, feet 36a and 36b attached to each segment 16 and 18, respectively.

The feet 36 of each support system 14 are preferably relatively coplanar and perpendicular to central axis 13. In order to maximize stability, it is preferred that the feet 36a of a support system 14a are spaced apart on the order of three to eleven inches. It is more preferable that the feet 36a are spaced apart on the order of five to eight inches. It is also preferable that feet 36b of support system 14b share approximately the same spacing as feet 36a of support system 14a.

Support systems 14a and 14b are shown in the Figures as each comprising two eyebolts having threads 38 connecting them to axle assembly 12. The eyes of the bolts comprise the curved contact feet 36. Alternatively, it is envisioned that each segment 16 and 18 could have one support system 14 comprising one piece, the piece having two integral feet 36.

It is also envisioned that feet 36 comprise rotatable wheels or casters. However, in order to minimize unit costs, it is preferable that support systems 14 comprise lengths of rigid material with curved contact feet 36 integrally formed in the ends of the systems. As discussed above, stainless steel eye bolts are suited for this purpose and are especially adapted to this use as they provide threaded ends 38, opposite the curved feet 36, for attachment to axle assembly 12.

Referring now to FIG. 3, tool 10 is shown being used in a laminating operation. A roll of masking 40 has been placed on axle assembly 12 by separating first axle segment 16 from second axle segment 18, placing each axle segment 16 and 18 through the center of roll 40, and reuniting first axle segment 16 with second axle segment 18 by pushing cantilever post 28 into open end 22 so that segments 16 and 18 confront or abut, thereby reforming axle assembly 12. When using longer rolls 40, care is taken to ensure length 34 is great enough to prevent roll 40 from contacting support systems 14. In this case, segments 16 and 18 confront each other, but are not close enough to abut.

Once axle assembly 12 has been reformed, tool 10, carrying roll 40, is placed on work platform 42 so that support systems 14 straddle work material 44, which is to be masked. It is preferable that feet 36 do not rest on material 44.

Operator 46 then places a downward pressure on the top of roll 40. As shown in FIG. 4, this causes post 28 to rotate within socket 22 around axis of rotation 13 until all feet 36 are contacting work platform 42 and bearing an equal load. If post 28 were not allowed to rotate within first axle segment tube 20 after reassembly, feet 36 would most often be uneven and tool 10 would rock in an unstable manner on work platform 42, thereby making a well masked product difficult and unlikely.

Once tool 10 has been properly leveled, preferably in the manner described above, operator 46 begins masking material 44 by carefully adhering a leading edge of masking 48 to the leading edge 50 of material 44. Operator 46 then slides tool 10 along work platform 42 so that axle assembly 12 straddles work material 44, allowing roll 40 to unravel along the way. Note that as tool 10, more specifically feet 36, slide or roll over platform 42, non-planar areas or irregularities in platform 42 will cause segments 16 and 18 to rotate relative to each other, thereby compensating for the irregularities. Additionally, the segment, 16 or 18, encountering the irregularities will impart an upward or downward angle on the axis of rotation 13. The relative rotation and resulting angles imparted on the axle assembly 12, ensure that the axis of rotation 13 remains substantially parallel to that area of platform 42 over which it is passing.

Operator 46 uses a second roll 52, or similar device, to press the masking from roll 40 onto work material 44. It is preferable that second roll 52 be of sufficient width to span the entirety of the width of the masking. It is also preferable that operator 46 maintain second roll 52 in relatively close, generally parallel proximity to roll 40, thereby minimizing the possibility of the masking making incorrect contact with working material 44.

It is envisioned, though not depicted, that second roll 52 be pivotally attached to tool 10 so that it appropriately follows roll 40 as tool 10 is moved. It is also envisioned that this second roll 52 be of sufficient weight to obviate the need for an operator 46 to press or otherwise physically manipulate roll 52 in order for it to accomplish its task of pressing and smoothing the masking onto working material 44.

Preferably, as shown in FIG. 3, operator 46 manipulates tool 10 along the platform 42 by holding roll 52 and moving roll 52 into tool 10, thereby moving both rolls 52 and 40 at once. This allows roll 40 to unroll freely and naturally. It also ensures a generally parallel relationship between rolls 52 and 40. Finally, it allows operator 46 to use one hand to secure material 44. Preferably, roll 40 is of sufficient weight to maintain enough downward force on tool 10 such that tool 10 levels itself as it passes over platform 42.

In the event that it is desired to mask a length of working material 44 that exceeds the length of work platform 42, tool 10 may be operated in a slightly different way, preferably using two operators 46. In the manner described above, roll 40 is placed on tool 10, tool 10 is leveled, and the leading edge 48 of masking is carefully aligned with and adhered to the leading edge 50 of working material 44. A first operator then holds tool 10 and roll 52 in place, while a second operator pulls working material 44 under tool 10 and roll 52. The first operator allows roll 40 to rotate around axle assembly 12, and also places an appropriate amount of pressure on roll 52 so that the masking is adequately pressed and smoothed onto working material 44. The first operator does not place so much pressure on roll 52 so as to inhibit the second operator's ability to smoothly and evenly pull working material 44 over working platform 42. Using this method, it is possible to mask a length of working material 44 generally equal to the length of masking material contained on roll 40.

It is possible to obviate the use of the first operator 46 in order to effect one person operation of the tool 10 when masking a long piece of signage material 44. Instead of having a first operator 46 hold tool 10 and applicator roll 52, roll 52 may by horizontally fixed to work platform 42 using a second tool (not pictured), similar to tool 10, having support members anchored to platform 42 and a shaft assembly carrying roll 52. With applicator 52 in place between the remaining operator 46 and hand tool 10, operator 46 may begin to pull on signage material 44. This will cause the tool 10 to slide across platform 42 until it abuts against horizontally fixed applicator roll 52. Once abutted, masking roll 40 will begin to unroll around shaft assembly 12 as material 44 is pulled by operator 46.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

What is claimed is:

1. A method of applying a masking layer from a roll of masking, to a material resting on a work platform, the masking having an adhesive side and a non-adhesive side opposite the adhesive side, comprising the steps of:

placing a roll of masking of a predetermined width on a hand tool for applying said masking layer to a material, the hand tool comprising an axle assembly for holding the roll of masking, the axle assembly defining a central axis, a plurality of support systems constructed and arranged to elevate the roll above the platform, the support systems having feet for contacting the platform and for allowing said tool to be moved across the platform by an operator;

pulling a length of masking from said roll so that said adhesive side faces said material;

adhering a leading edge of said adhesive side of said length of masking to a leading edge of said material;

placing on said nonadhesive side of said length of masking, an elongate object having a length at least as great as the width of the masking and further having a generally smooth, curved surface, so that the elongate object spans the entire width of the masking and makes positive contact therewith;

holding said tool and said object in relatively close proximity with each other, thereby maintaining a generally constant relative separation between the tool and the object;

moving said tool and said object together over said material, allowing said roll of masking to unroll, the unrolled masking passing under said object, thereby being adhered to said material as said masking is pressed thereon by said object continually adjusting the orientation of said central axis by, thereby maintaining said central axis generally parallel to said work platform.

2. The method of claim 1 wherein maintaining the orientation of said central axis generally parallel to said work platform axis further comprises placing continual downward pressure on said axle assembly.

3. A signage hand tool useable on a work platform having a non planar surface to allow a masking layer stored on a roll of masking to be applied in alignment with a sign face lying on the surface, comprising:

an axle assembly having a central axis and capable of supporting the roll of masking for rotation about said axle assembly;

said axle assembly including first and second axle segments, each said segment having a substantially cylindrical outer surface, said segments being positioned coaxially with each other and said first segment releasably engaging said second segment, said segments each including inner and outer ends with said inner ends confronting one another when said axle segments are engaged with one another;

said first axle segment further including a cantilever post positioned coaxially with said first axle segment and extending from said inner end;

said second axle segment further including a socket positioned coaxially within said segment at said inner end and extending toward said outer end, said socket constructed and arranged to mateably receive said post therein to releasably engage said first and second segments to permit the roll to be installed and removed from said axle and to permit the overall distance between said outer ends to be varied to accommodate rolls having different lengths;

first and second support systems, said first support system being fixed to said first axle segment and said second support system being fixed to said second axle segment adjacent each said outer end of said axle segments, said support systems positionable on the work platform to space said axle assembly upward from the work platform and from the sign face so as to allow free rotation of the roll relative to the sign face when the axle assembly is over the sign face, said support systems constructed and arranged to maintain said central axis of said axle assembly generally parallel to the sign face;

each said support system including first and second feet sidably engageable with the work platform, said first and second feet of said first support system located on a first plane substantially perpendicular to said central axis and said first and second feet of said second support system located on a second plane substantially perpendicular to said central axis, each support system having its said first foot spaced apart from its said second foot.

4. The signage hand tool of claim 3 wherein said socket of said second axle segment has a cylindrical periphery, thereby allowing relative rotation between said socket and said post of said first axle segment about said central axis to permit the feet of said first and second support systems to be able to closely follow and engage the work platform to adjust to local irregular variations in the work platform so as to keep said central axis generally parallel to the sign face when said tool is sidably moved along the work platform by an operator.

5. The signage hand tool of claim 4 wherein said post has a cylindrical periphery receivable into said socket.

6. The signage hand tool of claim 4 wherein each said foot includes a narrow curved surface positioned to contact the work platform.

7. The signage hand tool of claim 4 wherein each said support system includes a pair of eyebolts, each said eyebolt including a shank threaded into said axle assembly and each said eyebolt including an eye with a narrow curved surface positioned to contact the work platform, said narrow curved surface of each said eyebolt defining one of said feet.

8. The hand tool of claim 7 wherein said second axle segment mating post further comprises a protuberance extending substantially perpendicularly to said axis of rotation for providing increased friction between said first axle segment opening and said second axle segment mating post.

9. The signage hand tool of claim 4 wherein said second axle segment cantilever post comprises a protuberance extending substantially perpendicularly to said central axis for providing increased friction between said first axle segment socket and said second axle segment cantilever post.

10. The signage hand tool of claim 4 wherein said feet of said first support system are generally coplanar and said feet of said second support system are generally coplanar.

11. The signage hand tool of claim 4 wherein said feet of said first support system are separated by a distance of between three and eleven inches.

12. The signage hand tool of claim 4 wherein said feet of said first support system are separated by a distance of between five and eight inches.

13. A signage hand tool for applying a layer of masking from a roll of masking to a sheet of material having a predefined width, the tool intended for use on a work platform, the tool comprising:

an axle assembly for rotatably carrying the roll of masking;

a plurality of curved feet for providing an interface between the working platform and said tool;

at least two support systems connecting said feet to said axle assembly;

said axle assembly comprising a first axle segment and a second axle segment, the first axle segment defining a socket, the second axle segment comprising a cantilever post sized to frictionally fit within said first axle segment socket, one of said first axle segment or said second axle segment having a circular cross section, thereby allowing relative rotation between said first and second axle segments around an axis of rotation parallel with said axle assembly, such that when a downward force is placed on the axle assembly, the first axle segment and second axle segment rotate relative to each other until each of said feet make uniform contact with the work platform, said first and second axle segments constructed and arranged to form a cylindrical outer surface when said cantilever post is inserted within said socket,.

14. The tool of claim 13 wherein said cantilever post and said socket are of a predetermined length sufficient to allow said cantilever post to be telescopically received by said socket such that said axle assembly defines a range of possible widths, thereby accommodating masking rolls of varying widths.

15. The tool of claim 13 wherein said support systems are constructed and arranged to span the entire width of the material and are arranged to create a distance between any of the contact surfaces of said support systems attached to said first axle segment, and any of said contact surfaces of said support systems attached to said second axle segment which is greater than the width of the material being masked.

16. The tool of claim 13 wherein said feet further comprise curved surfaces integral with said support systems.

17. The tool of claim 13 wherein each of said support systems connects one of said feet with said axle assembly.

18. The tool of claim 13 wherein each of said support systems connects at least two of said contact surfaces with said axle assembly.

19. The tool of claim 13 wherein said cylindrical outer surface is completely defined by said first axle segment of said axle assembly.

20. The tool of claim 13 wherein said cylindrical outer surface is completely defined by said second axle segment of said axle assembly.

* * * * *